(12) United States Patent
Younts et al.

(10) Patent No.: US 11,474,344 B2
(45) Date of Patent: Oct. 18, 2022

(54) PROGRAMMABLE, DEFORMABLE INCIDENT-ENERGY SHAPER FOR DEFORMING INCIDENT ENERGY WAVES

(71) Applicant: United States Government as represented by the Secretary of the Navy, San Diego, CA (US)

(72) Inventors: Robert Alexander Younts, Moncks Corner, SC (US); Tian-Bing Xu, Chesapeake, VA (US); Laura Catherine Tolliver, Charleston, SC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 160 days.

(21) Appl. No.: 17/089,044

(22) Filed: Nov. 4, 2020

(65) Prior Publication Data

US 2022/0137394 A1     May 5, 2022

(51) Int. Cl.
*G02B 26/08* (2006.01)
*G10K 15/04* (2006.01)
*G02B 26/00* (2006.01)

(52) U.S. Cl.
CPC ....... *G02B 26/0825* (2013.01); *G02B 26/004* (2013.01); *G10K 15/04* (2013.01)

(58) Field of Classification Search
CPC ... G02B 26/0825; G02B 26/004; G10K 15/04
See application file for complete search history.

(56) References Cited

FOREIGN PATENT DOCUMENTS

DE    102012212953 A1 * 6/2013 ......... G02B 17/0663

OTHER PUBLICATIONS

Saekwang Nam et al.; Structure Modulated Electrostatic Deformable Mirror for Focus and Geometry Control; Optics Express; vol. 24, No. 1; Jan. 4, 2016.
Wikipedia; Deformable Mirror; Available Online at https://en.wikipedia.org/wiki/Deformable_mirror; Jun. 14, 2020.

* cited by examiner

*Primary Examiner* — James C. Jones
(74) *Attorney, Agent, or Firm* — Naval Information Warfare Center, Pacific; Kyle Eppele; James Eric Anderson

(57) ABSTRACT

A programmable, deformable incident-energy shaper comprising: a base having top and bottom surfaces with a perforation there-between; a protrusion connected to, and extending outwardly from, a center of the top surface; a deformable layer firmly attached to the base's perimeter and to a tip of the protrusion such that a majority of the deformable layer is suspended in free space between the tip and the perimeter, wherein the deformable layer is configured to flex inwardly or outwardly, and wherein the perforation provides a fluid channel to ambient fluid; and an actuator, operatively coupled to the deformable layer and configured to cause the deformable layer to flex inwardly or outwardly upon command.

20 Claims, 7 Drawing Sheets

Neutral Flex

Inward Flex

Outward Flex

Neutral Position

Inwardly-Flexed

Outwardly-Flexed under US 11,474,344 B2

PROGRAMMABLE, DEFORMABLE INCIDENT-ENERGY SHAPER FOR DEFORMING INCIDENT ENERGY WAVES

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 111312.

BACKGROUND OF THE INVENTION

This invention relates to the field of incident-energy shapers, such as optical beam and/or acoustic energy steering technologies. There is a need for an improved incident-energy shaper.

SUMMARY

Described herein is a programmable, deformable incident-energy shaper comprising a base, a protrusion, a deformable layer, and an actuator. The base has top and bottom surfaces with a perforation there-between. The protrusion is connected to, and extends outwardly from, a center of the top surface. The deformable layer is firmly attached to the base's perimeter and to a tip of the protrusion such that a majority of the deformable layer is suspended in free space between the tip and the perimeter. The deformable layer is configured to flex inwardly or outwardly. The perforation provides a fluid channel to ambient fluid. The actuator is operatively coupled to the deformable layer and configured to cause the deformable layer to flex inwardly or outwardly upon command.

In one embodiment, the programmable, deformable incident-energy shaper may be described as comprising: a circular base, a protrusion, a deformable layer and an actuator. The circular base has perforations formed therein between top and bottom surfaces. The protrusion is connected to, and extends outwardly from, a center of the top surface. The deformable layer comprises an electroactive sublayer and a reflective outer surface. The deformable layer is firmly attached to the base's perimeter and to a tip of the protrusion such that the base and the deformable layer form a conical prism when the deformable layer is in a neutral position. The deformable layer is configured to flex inwardly to an inwardly-flexed position or outwardly to an outwardly-flexed position. The perforations provide a fluid channel to ambient fluid. The actuator is operatively coupled to the deformable layer and configured to cause the deformable layer to transition between the outwardly- and inwardly-flexed positions by applying an electric potential to the electroactive sublayer.

Another embodiment of the programmable, deformable incident-energy shaper comprises a base, a protrusion, a deformable layer, and an actuator. In this embodiment, the base has top and bottom surfaces and the protrusion is connected to, and extends outwardly from, a center of the top surface. The deformable layer is firmly attached to the base's perimeter and to a tip of the protrusion so as to cover the top surface and the protrusion such that a cavity exists between the deformable layer and the base. The deformable layer is configured to flex inwardly or outwardly. The actuator, in this embodiment, is operatively coupled to the deformable layer and configured to cause the deformable layer to flex inwardly or outwardly upon command by respectively removing or injecting fluid from/into the cavity.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
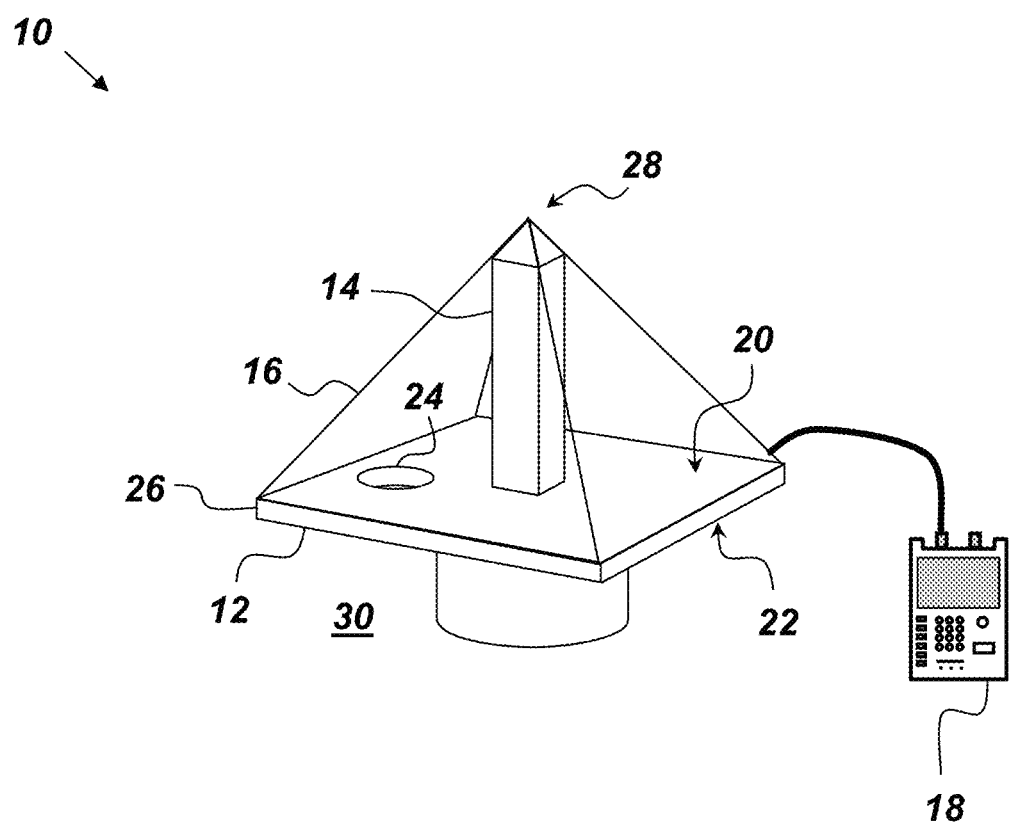
FIG. 1 is a perspective-view illustration of an embodiment of an incident-energy shaper.

FIG. 1 is a perspective-view illustration of an embodiment of an incident-energy shaper 10 that is programmable and deformable. The incident-energy shaper 10 shown in FIG. 1 comprises, consists of, or consists essentially of a base 12, a protrusion 14, a deformable layer 16, and an actuator 18. The base 12 has a top surface 20, a bottom surface 22, and a perforation 24 between the top and bottom surfaces 20 and 22. The protrusion 14 is connected to, and extends outwardly from, a center of the top surface 20. The deformable layer 16 is firmly attached to the base 12's perimeter 26 and to a tip 28 of the protrusion 14 so as to cover the top surface 20 and the protrusion 14. The deformable layer 16 is configured to flex inwardly or outwardly such as is shown in FIGS. 2B and 2C respectively. The perforation 24 provides a fluid channel to ambient fluid 30. The actuator 18 is operatively coupled to the deformable layer 16 and configured to cause the deformable layer 16 to flex inwardly or outwardly upon command. In this embodiment of the incident-energy shaper 10, the deformable layer 16 is transparent and has a different index of refraction than the surrounding ambient fluid 30. This enables incoming electromagnetic energy to be refracted by the incident-energy shaper 10.

Figure 2A:
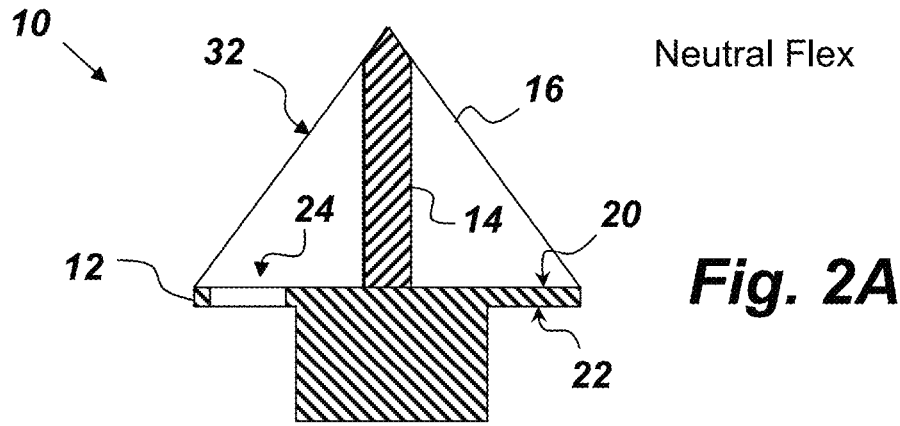
FIGS. 2A, 2B, and 2C are cross-sectional, side-views of the embodiment of the incident-energy shaper shown in FIG. 1.
Figure 2B:
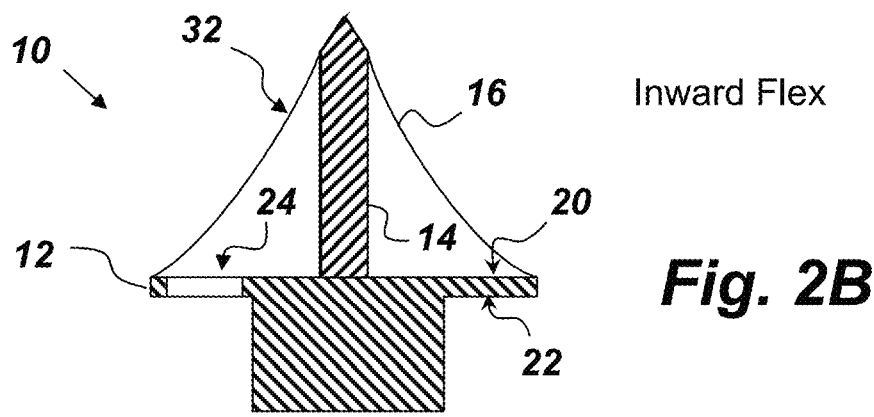
Figure 2C:
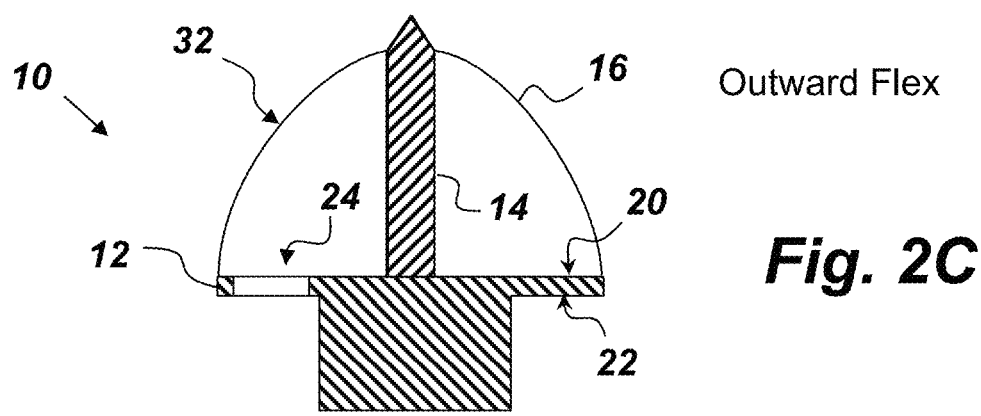

FIGS. 2A, 2B, and 2C are cross-sectional, side-views of the embodiment of the incident-energy shaper 10 shown in FIG. 1. FIG. 2A shows the incident-energy shaper 10 in a neutrally-flexed position. FIG. 2B shows the incident-energy shaper 10 in an inwardly flexed position. FIG. 2C shows the incident-energy shaper 10 in an outwardly flexed position.

Figure 6:
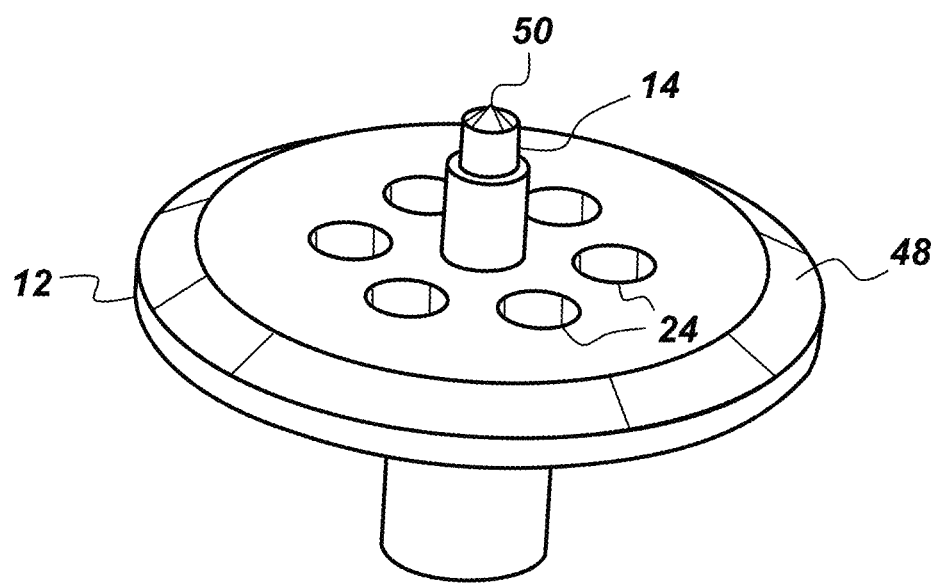
FIG. 6 is a perspective-view illustration of a base and a protrusion used in the conical embodiment of the incident-energy shaper depicted in FIGS. 5A-5C.

The base 12 and the protrusion 14 may be made of any rigid material capable of supporting the deformable layer 16. The base 12 may be separately manufactured from, and made of different material than, the protrusion 14. In some embodiments, the protrusion 14 and the base 12 may be manufactured together as a monolithic structure. For example, the base 12 and the protrusion 14 may be made of polyactic acid (PLA) via an additive manufacturing process. The ambient fluid 30 may be any gas or liquid. Suitable examples of the ambient fluid 30 include, but are not limited to, air, oil, ink, and water. The base 12 may have any desired size and shape. For example, the base 12 may have a round or polygonal shape. For example, in one embodiment, the base 12 has a circular shape with a 45°-beveled perimeter edge (such as is shown in FIG. 6).

The deformable layer 16 comprises any material or structure that can be made to flex in response to a signal/action of the actuator 18. The deformable layer 16 has an outer surface 32. Suitable examples of materials that can be made to flex in response to a signal/action of the actuator 18 include, but are not limited to, electroactive materials, passive flexible membranes, materials that flex in response to thermal stimuli, and materials that flex in response to exposure to magnetic fields. The actuator 18 may be any device capable of causing the deformable layer 16 to flex in a controlled manner. For example, depending on the nature of the deformable layer 16, the actuator 18 could be, but is not limited to, an electric signal generator, a magnetic field generator, a heater/cooling unit, a forced air source, a fluid jet, or a combination of any of these.

Figure 3A:
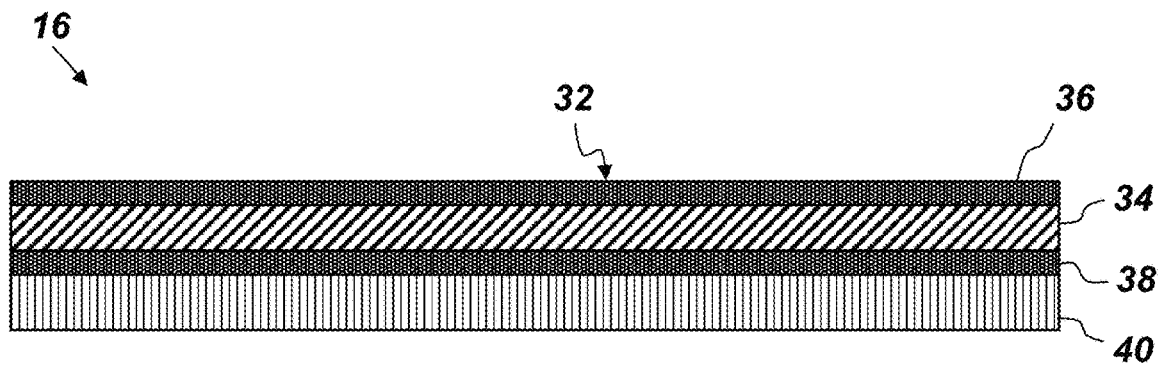
FIGS. 3A-3C and 4A-4B are cross-sectional, side-view illustrations of different, example embodiments of a deformable layer.
Figure 3B:
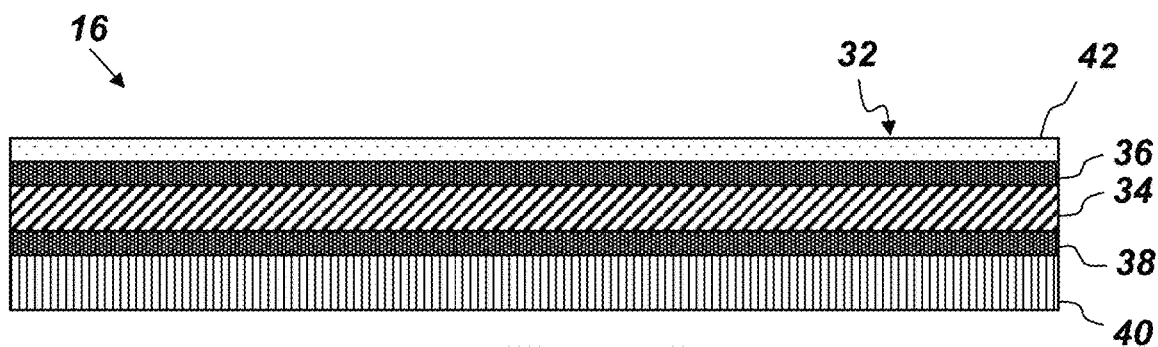
Figure 3C:
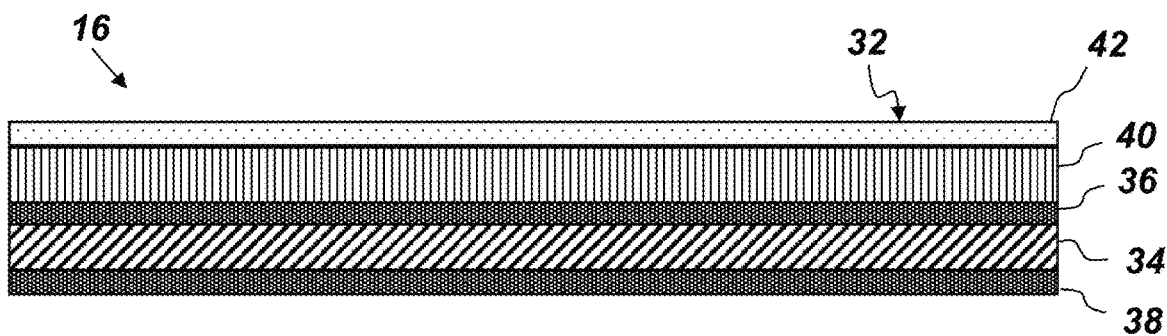
Figure 4A:
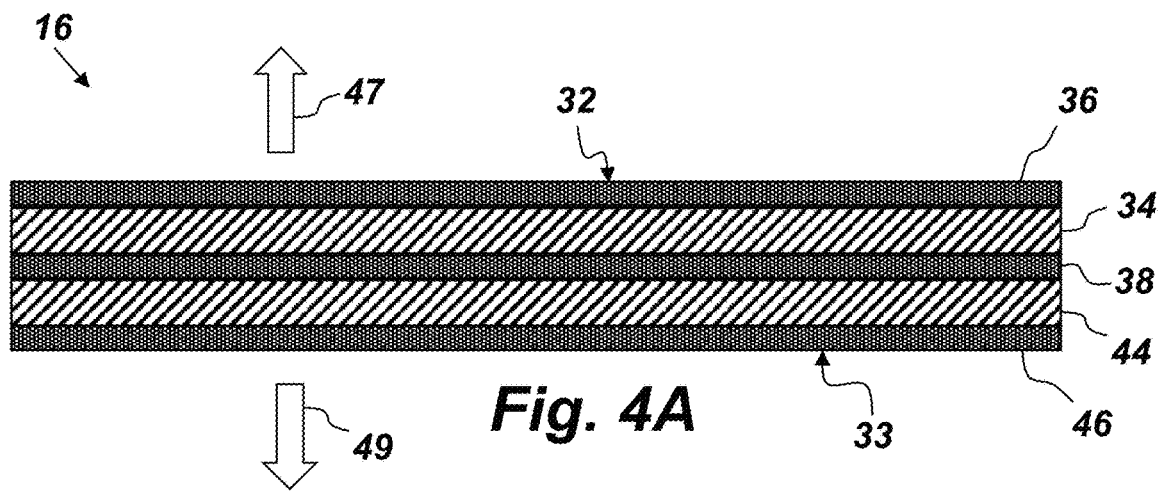

FIGS. 3A-3C and 4A-4B are cross-sectional, side-view illustrations of different, example embodiments of the deformable layer 16. The embodiment of the deformable layer 16 shown in FIG. 3A comprises a first deformable sublayer 34, an outer electrode 36, an inner electrode 38, and a passive layer 40. The coupling of one or more active layers, such as the outer electrode 36 and the inner electrode 38, with a passive layer, such as the passive layer 40, causes a strain gradient resulting in the flexure of the deformable layer 16. Without the passive layer, the deformable layer 16 would expand or contract, but there would not be flexure. In FIG. 3A, the outer electrode 36 is reflective and capable of reflecting electromagnetic energy waves thus turning this embodiment of the incident-energy shaper 10 into a deformable mirror. The first deformable sublayer 34 is configured to flex in response to a signal from the actuator 18 via the outer and inner electrodes 36 and 38. The deformable layer 16 shown in FIG. 3B comprises the components shown in FIG. 3A plus a separate reflective layer 42 disposed on top of the outer electrode 36. The deformable layer 16 shown in FIG. 3C comprises all the components shown in FIG. 3B, but in this embodiment, the passive layer 40 is disposed between the reflective layer 42 and the outer electrode 36. The deformable layer 16 shown in FIG. 4A comprises the first deformable sublayer 34, the outer electrode 36, the inner electrode 38, a second deformable sublayer 44, and a third electrode 46. The deformable layer 16 shown in FIG. 4B includes all the components as shown in FIG. 4A plus the reflective layer 42 disposed on top of the outer electrode 36.

The first and second deformable sublayers 34 and 44 are made of electroactive materials. Suitable examples of electroactive materials include, but are not limited to, electroactive polymers (including piezoelectric polymers, electrostrictive polymers, ion elastomers, dielectric elastomers, and graft-elastomers), electroactive composites (including polymer-ceramic composites, nanocomposites, nanotube-composites, graphene composites) piezoelectric ceramics, electrostrictive ceramics, piezoelectric thin films, electroactive thin films, shape memory polymers, shape memory composites, shape memory alloys, and electroactive deformable capacitors. Suitable examples of material from which the passive layer 40 may be made include, but are not limited to, plastics, polymers, and dielectrics. In some embodiments, the passive layer 40 may be made of the same electroactive material as the first deformable sublayer 34. Suitable examples of material from which the outer and inner electrodes 36 and 38 may be made include, but are not limited to, metals, such as aluminum, silver, and gold. Other suitable examples of material from which the outer and inner electrodes 36 and 38 may be made include optically transparent conductors such as indium tin oxide. For a reflective application where the outer surface 32 is reflective, the deformable layer 16 may be comprised of a thin, deformable sheet of functional material or could be a thin layer of metal deposited under vacuum. For a diffractive embodiment of the incident-energy shaper 10, the deformable layer 16 has a different index of refraction from the transmission medium. In either the reflective or diffractive case, the placement and/or patterning of the electrodes can vary based on the desired flexed and unflexed properties of the deformable layer 16.

Figure 4B:
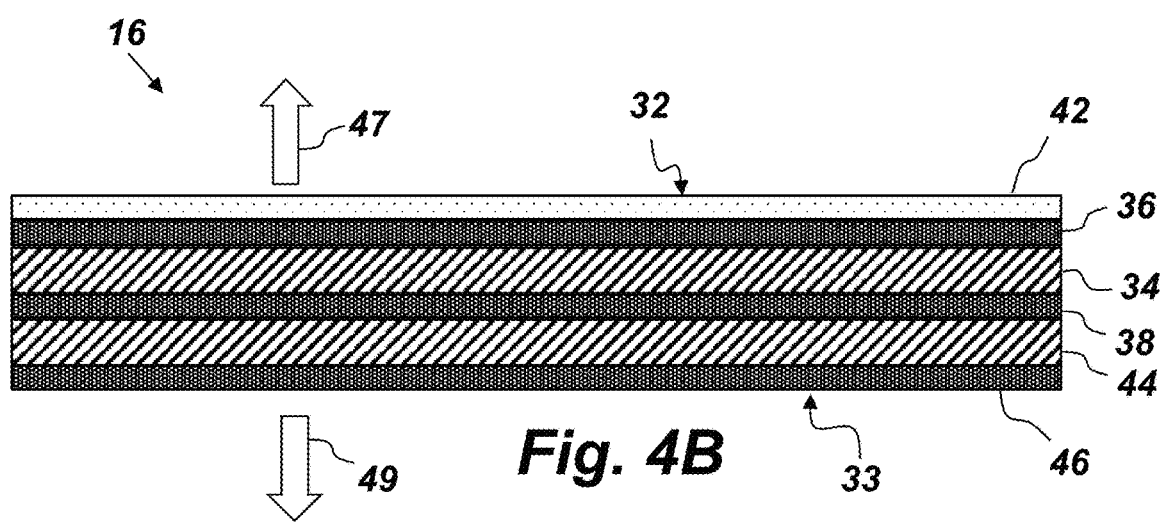

Referring to FIGS. 4A-4B, this embodiment of the deformable layer 16 is designed such that applying an electric potential to the first deformable sublayer 34 through electrodes 36 and 38 causes the deformable layer 16 to flex in a first direction 47, which in this case is outwardly. This embodiment of the deformable layer 16 is also designed such that applying an electric potential to the second deformable sublayer 44 through electrodes 38 and 46 causes the deformable layer 16 to flex in a second direction 49 that is opposite to the first direction (e.g., inwardly in this example).

Figure 5A:
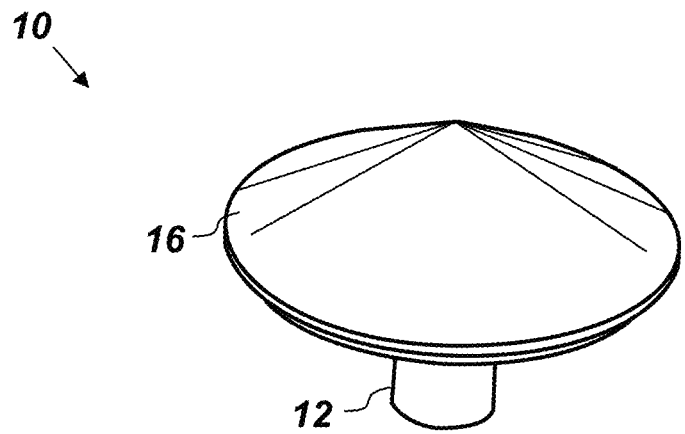
FIGS. 5A-5C are perspective-view illustrations of a conical embodiment of an incident-energy shaper.
Figure 5B:
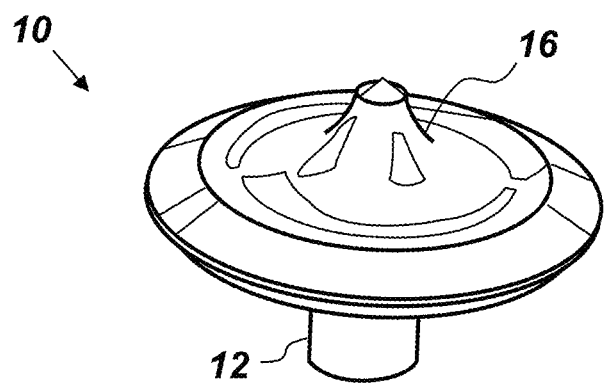
Figure 5C:
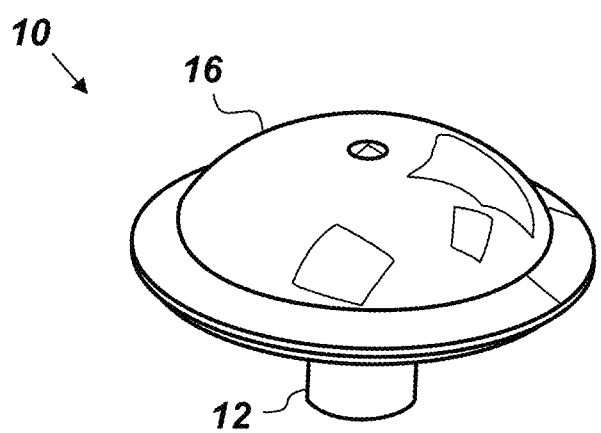

FIGS. 5A-5C are perspective-view illustrations of a conical embodiment of the incident-energy shaper 10, in which the base 12 has a circularly-shaped perimeter. FIG. 5A shows the incident-energy shaper 10 in the neutral position—where the deformable layer 16, the protrusion 14, and the base 12 interact with each other to form a conical prism. In FIGS. 5A-5C, the base 12 and the protrusion 14 are covered by the deformable layer 16 and therefore are not labelled in those figures. However, those features (i.e., the base 12 and the protrusion 14) are shown in FIG. 6. FIG. 5B shows the conical embodiment of the incident-energy shaper 10 in an inwardly-flexed position. FIG. 5C shows the conical embodiment of the incident-energy shaper 10 in an outwardly-flexed position. As shown in FIG. 5A, the neutral position shape of the reflective deformable layer 16 is a conical prism that tapers from a flat base to a vertex/concave plane or a vertex/concave point. The conical shape on which the mirror is based could be a right cone or an oblique cone depending on the application. The dimensions of the conical prism (e.g., slant height, radius, etc.) can vary depending on the desired application.

FIG. 6 is a perspective-view illustration of the base 12 and the protrusion 14 used in the conical embodiment of the incident-energy shaper 10 depicted in FIGS. 5A-5C. In this embodiment, the base 12 comprises six perforations 24 and a beveled edge 48, and the tip 50 of the protrusion 14 is also beveled. The beveled edge 48 and the tip 50 provide mounting surfaces for the deformable layer 16. For example, the deformable layer 16 may be attached with an adhesive to the beveled edge 48 and to the tip 50. The angle of the beveled edge and the angle of the bevel on the tip 50 may be fabricated such that the deformable layer forms a cone when adhered thereto and when in the neutral position such as is depicted in FIG. 5A.

The incident-energy shaper 10 may be used to send and receive acoustic signals. For example, the actuator 18 may be configured to cause the deformable layer 16 to flex to produce an acoustic signal. The acoustic signal produced by the incident-energy shaper 10 could be a low frequency signal or a higher frequency signal in the ultrasonic range. The dimensions and materials of each component of the incident-energy shaper 10 can be tuned to produce a variety of resonant modes for operation. Furthermore, a variety of optical and acoustic waveforms could be produced through appropriate patterning of the electrodes. The incident-energy shaper 10 could be used to generate spiral acoustic waves, or acoustic waves with some order of helicity or angular momentum. The incident-energy shaper 10 may also be used in an optical application to impart orbital angular momentum. Additionally, through appropriate patterning and control in both the vertical and radial directions, multiplexing may be achievable in a single embodiment of the incident-energy shaper 10.

Figure 7:
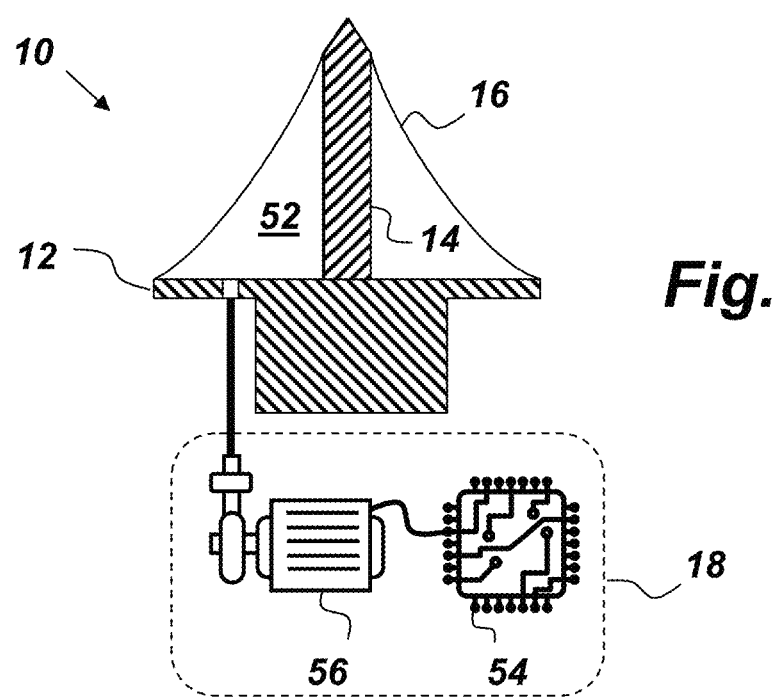
FIG. 7 is a side-view illustration of an embodiment of an incident-energy shaper.

FIG. 7 is a side-view illustration of an embodiment of the incident-energy shaper 10 where the actuator 18 is configured to cause the deformable layer 16 to flex inwardly or outwardly upon command by respectively removing or injecting fluid from/into a cavity 52 between the deformable layer 16 and the base 12 and protrusion 14. The fluid may be a gas or liquid that is pumped into the cavity 52 to cause the deformable layer 16 to outwardly flex. To cause the deformable layer 16 to flex inwardly, the fluid may be withdrawn out of the cavity 52 such that the pressure within the cavity 52 is less than the pressure of the ambient atmosphere. In this embodiment, the actuator 18 comprises a processor 54 and a pump 56 configured to remove or inject fluid into the cavity 52.

The incident-energy shaper 10 may be used as a deformable mirror for optical, acoustic, or optoacoustic refraction, diffraction, or generation in free space or a variety of solid and/or fluid media. For example, in one instance, the input to the incident-energy shaper 10 could be a Gaussian laser focused through a conical lens and then shaped using the deformable layer 16. Either alone or in combination, the inner surface 33 and the outer surface 32 of the deformable layer 16 can be used to shape an incident beam of energy.

From the above description of the incident-energy shaper 10, it is manifest that various techniques may be used for implementing the concepts of incident-energy shaper 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that incident-energy shaper 10 is not limited to the particular embodiments described herein, but is capable of many embodiments without departing from the scope of the claims.

We claim:

1. A programmable, deformable incident-energy shaper comprising:
    a base having top and bottom surfaces with a perforation there-between;
    a protrusion connected to, and extending outwardly from, a center of the top surface;
    a deformable layer firmly attached to the base's perimeter and to a tip of the protrusion such that a majority of the deformable layer is suspended in free space between the tip and the perimeter, wherein the deformable layer is configured to flex inwardly or outwardly, and wherein the perforation provides a fluid channel to ambient fluid; and
    an actuator, operatively coupled to the deformable layer and configured to cause the deformable layer to flex inwardly or outwardly upon command.

2. The incident-energy shaper of claim 1, wherein an outer surface of the deformable layer is reflective to electromagnetic energy waves.

3. The incident-energy shaper of claim 2, wherein the deformable layer comprises a first deformable sublayer that is electroactive, wherein the actuator is configured to cause the deformable layer to transition between the outwardly and inwardly flexed positions by applying an electric potential to the first deformable sublayer.

4. The incident-energy shaper of claim 1, wherein the deformable layer is a transparent electroactive material having a different index of refraction than the ambient fluid thereby enabling the incident-energy shaper to refract electromagnetic energy waves.

5. The incident-energy shaper of claim 1, wherein the deformable layer deforms when subjected to an electrical field and is selected from the group consisting of: electroactive polymers, electroactive composites, piezoelectric ceramics, electrostrictive ceramics, piezoelectric thin films, electroactive thin films, shape memory polymers, shape memory composites, shape memory alloys, and electroactive deformable capacitors.

6. The incident-energy shaper of claim 1, wherein the perimeter has a circular shape.

7. The incident-energy shaper of claim 1, wherein the perimeter has a polygonal shape.

8. The incident-energy shaper of claim 1, wherein the ambient fluid is air.

9. The incident-energy shaper of claim 3, wherein the deformable layer is attached to the base perimeter and the tip of the protrusion with an adhesive.

10. The incident-energy shaper of claim 3, wherein the deformable layer further comprises inner and outer electrodes disposed on opposing surfaces of the first deformable sublayer.

11. The incident-energy shaper of claim 10, wherein the deformable layer further comprises a second deformable sublayer and a third electrode, wherein the inner electrode is disposed between the first and second deformable sublayers, and wherein the third electrode is disposed on an inner surface of the second deformable sublayer.

12. The incident-energy shaper of claim 1, wherein the actuator is configured to cause the deformable layer to flex to produce an acoustic signal.

13. A programmable, deformable incident-energy shaper comprising:
    a circular base having perforations formed therein between top and bottom surfaces;
    a protrusion connected to, and extending outwardly from, a center of the top surface;
    a deformable layer comprising a first electroactive sublayer and a reflective outer surface, wherein the deformable layer is firmly attached to the base's perimeter and to a tip of the protrusion such that the base and the deformable layer form a conical prism when the deformable layer is in a neutral position, wherein the deformable layer is configured to flex inwardly to an inwardly-flexed position or outwardly to an outwardly-flexed position, and wherein the perforations provide a fluid channel to ambient fluid; and an actuator, operatively coupled to the deformable layer and configured to cause the deformable layer to transition between the outwardly- and inwardly-flexed positions by applying an electric potential to the first electroactive sublayer.

14. The incident-energy shaper of claim 13, further comprising an inner electrode attached to an inner surface of the deformable layer and wherein the reflective outer surface is an outer electrode.

15. The incident-energy shaper of claim 14, wherein the ambient fluid is air.

16. The incident-energy shaper of claim 15, wherein the deformable layer is attached to the base perimeter and the tip of the protrusion with an adhesive.

17. The incident-energy shaper of claim 16, wherein the deformable layer further comprises a second electroactive sublayer and a third electrode, wherein a surface of the second electroactive sublayer is attached to the inner electrode, and wherein a second surface of the second electroactive sublayer is attached to the third electrode such that applying an electric potential to the first electroactive sublayer causes the deformable layer to flex in first direction and applying an electric potential to the second electroactive sublayer causes the deformable layer to flex in a second direction that is opposite to the first direction.

18. A programmable, deformable incident-energy shaper comprising:
a base having top and bottom surfaces;
a protrusion connected to, and extending outwardly from, a center of the top surface;
a deformable layer firmly attached to the base's perimeter and to a tip of the protrusion so as to cover the top surface and the protrusion such that a cavity exists between the deformable layer and the base, wherein the deformable layer is configured to flex inwardly or outwardly; and
an actuator operatively coupled to the deformable layer and configured to cause the deformable layer to flex inwardly or outwardly upon command by respectively removing or injecting fluid from/into the cavity.

19. The incident-energy shaper of claim 18, wherein an outer surface of the deformable layer is coated with a reflective material capable of reflecting electromagnetic energy waves.

20. The incident-energy shaper of claim 18, wherein the deformable layer is transparent having a different index of refraction than ambient fluid surrounding the incident-energy shaper thereby enabling the incident-energy shaper to refract electromagnetic energy waves.

* * * * *